United States Patent Office

3,752,684
Patented Aug. 14, 1973

3,752,684
INSULATING REFRACTORY AND A METHOD
FOR MANUFACTURING SAME
Jean-Pierre Kiehl, Lyon, and Victor Jost, Bron, France, assignors to Societe Generale des Produits Refractaires Paris, France
No Drawing. Filed June 14, 1971, Ser. No. 153,099
Claims priority, application France, July 9, 1970, 70/25,437
Int. Cl. C04b 35/04
U.S. Cl. 106—58           3 Claims

ABSTRACT OF THE DISCLOSURE

A semirigid insulating product and method of making same having a use-limit temperature of at least 1200° C. and a density less than 0.9 gm./cc. The product is made from a batch comprising, by weight:

Neutral magnesium phosphate—12 to 25%
Alkaline-earth oxides in excess—up to 5%
Silica—50 to 80%
Other acid oxides—up to 20%, and
Mineral fibers—2 to 20%

---

The term insulating refractory is generally applied to products with a total porosity of more than 45% and a melting point greater than 1500° C. A great variety of such insulating refractories is known, some of which are usable up to 1800° C. and higher.

The known materials have several drawbacks. Due to the substantial temperature gradient to which they are subjected, these refractories have rather poor resistance to abrupt temperature changes, and this is frequently manifested in spalling and cracking of the refractory pieces. They are rigid and when they are subjected to deformation of more than 5% and occasionally less, they lose all their mechanical resistance and crumble when decompressed. They require firing at more than 1000° C. in order to form a ceramic bond, which imparts to them their mechanical properties and in order to remove the burnout material which gives these insulating refractories their lightness. This firing must be done all the more carefully, the greater the volume of the desired refractory pieces is. Consequently, the majority of the insulating bricks and refractory pieces are still commercialized at present in the form of bricks or pieces with a volume of less than 0.005 cubic meter. The labor costs for construction of masonry made of insulating refractories, therefore, are very high.

There are fibrous insulating refractories with a base of refractory clays or refractory oxides. These materials generally have a density of less than .4 gm./cc. They are very insulating and resist abrupt temperature changes, but as far as their structure itself is concerned, they possess only slight mechanical resistance to compression. They can be used as fillers between sheet-iron ware and a refractory wall, provided that the refractory masonry does not press on the fibers under any circumstances. Their use for hot gas lines (circular pipes in blast furnaces, transfer lines for petrochemistry) or for insulating rotary furnaces can, therefore, not be feasible. Moreover, the cost price of refractory fibers is many times greater than that of insulating refractories, which places another limitation on their use.

Semirefractory and semirigid insulating products already exist. These products are composed of a light material of the diatomite, vermiculite or perlite type in association with a mineral fiber such as mineral wool or asbestos, all combined with these refractory cements. The melting temperature of these semirefractory insulants ranges from 1100° to 1300° C.

These materials are used in great quantities for insulating numerous metallurgical apparatuses. In fact, they combine a low density (0.35 to 0.60 gm./cc.), an excellent resistance to thermal shock, a low cost price and the capability of being compressed without losing their mechanical resistance, even when the rate of compression exceeds 5%. Thus, these insulating materials adapt themselves to the expansion of the masonry without losing their principal properties. Unfortunately, however, the low melting point of these materials does not permit them to be used at temperatures greater than 1050°–1100° C.

Briefly, according to this invention, there are provided composite insulating materials which have a melting point of at least 1500° C. and a use-limit temperature of at least 1200° C. The materials have a density of less than 0.9 gm./cc., preferably between 0.4 and 0.6 gm./cc. are prepared from a batch comprising, by weight:

Neutral magnesium phosphate—12 to 25%
Alkaline-earth oxides in excess—up to 5%
Silica—50 to 80%
Other acid oxides—up to 20%, and
Mineral fibers—2 to 20%

The composition of the products according to this invention is not a definite chemical compound, but rather a special type of mixture of several distinct materials. The neutral magnesium phosphate is an element essential to the fabrication process; the alkaline-earth oxides are present only to ensure absolute neutrality of the phosphate employed; the silica and the acid oxides constitute a refractory charge. The mineral fibers form a reinforcement against shrinkage and also add to the lightness and flexibility of the material.

These refractory materials have a resistance to compression which increases with the rate of crushing (percentage deformation) at least equal to the following values:

| Rate of crushing, percent: | Resistance to compression, kg./cm.² |
|---|---|
| 5 | 2 |
| 15 | 5 |
| 30 | 10 |

Their insulating power is due to their low heat conductivity which at 400° C. is no greater than 0.25 kcal./m./m.²/° C./hr. and at 800° C. is no greater than 0.35 kcal./m./m.²/° C./hr.

These products may be formed as blocks or panels of standard dimensions or shaped as required. They may be cut and machined. They may, for example, be used to advantage for:

Insulating the Cowpers (a type of regenerator) of blast furnaces, between the sheet work and the interior refractory chimney, as well as insulating the hot air ducts that connect the Cowper apparatuses to the blast furnaces;
Insulating the side walls and arched roofs of metallurgical heat treating furnaces;
Insulating the primary furnaces of the petroleum and petrochemical industry (cracking furnaces, reforming furnaces);
Insulating aluminum and nonferrous metals electrolysis tanks;
Insulating furnaces with glassmaking tanks; and,
Fabricating insulating feedheads for steel casting.

A fabricating process within the scope of the invention consists of the steps of (a) forming an aqueous mixture of silica, magnesia, possibly alkaline-earth oxides, mineral fibers and at least one acid magnesium phosphate, (b) pouring it into a mold, (c) permitting it to set and harden at ambient temperature by formation of hydrate neutral phosphates, and (d) oven drying it between 100 and 350°

C. in order to remove at least 75% of the water it contains.

The proportions of the mineral materials are determined by the composition of the product that one wishes to make. The amount of water in the initial mixture may vary from 70 to 140% of the weight of the batch materials.

In order to form the mixture, it is preferable first of all to disperse in the water the desired amount of mineral fibers, silica, magnesia and alkaline-earth oxides. After the whole has been homogenized, a phosphate is introduced. Then it is cast in the mold. After several minutes the soft gel is formed and the neutralizing reaction is permitted to develop until the hard gel is formed. This reaction is due to the progressive saturation of the acid phosphate to neutral phosphate which crystallizes with a certain number of molecules of water. Hardening is obtained in a period of about ¼ hour. The blocks or shapes may then be removed from the mold and introduced into the drying oven for the dehydration phase in the course of which at least 75% and preferably 85 to 90% of the water is removed. The presence of the fibers prevents linear shrinkage in excess of 2% by the drying of the material. The latter thus acquires the desired lightness without addition of combustible burnout materials. The balance of the water disappears during use in the course of heating up.

The original silica may be introduced in any desired form, even sand or rock not completely pure. A portion of the silica may be replaced by other acid oxides such as $Al_2O_3$, $ZrO_2$, $Cr_2O_3$ and $TiO_2$. The magnesia may be dead burned magnesia, caustic magnesia, magnesite and precipitated magnesium carbonate. These materials may, without disadvantage, contain up to 10% of impurities consisting of other oxides. These solid components must be in grains of less than 2 mm., and preferably less than 1 mm.

The mineral fibers are, for example, asbestos of the amosite family, fibers of 45 to 50% aluminum, pure aluminum fibers or other refractory mineral fibers. They may be of one or several varieties.

The $P_2O_5$ may be introduced in the form of a powdered anhydride, of a phosphoric acid in solution or acid magnesium phosphates.

An important advantage of the process is that it is possible to obtain the product in any basic volume compatible with reasonable drying. Thus, it would be possible to fabricate elements having a volume of one cubic meter as well as elements with a small volume or complex shape.

EXAMPLE

By way of example, the following are mixed in 125 liters of water:

85 kg. of siliceous said crushed into 75 micron size;
3 kg. of long-fiber amosite asbestos;
4 kg. of short fiber amosite asbestos;
8 kg. of dead burned magnesia crushed into 75 micron size.

The obtained slip is homogenized and then 14.5 kg. of an 85% solution of phosphoric acid is added. It is homogenized again for less than 2 minutes and poured into a 200 liter mold. The reaction of the phosphoric acid begins to set at once and produces hard gelatin of the mixture in 20 minutes. The piece is removed from the mold and is dried for 48 hours in a kiln at 200° C. A shrinkage of 0.5% is ascertained.

The semirigid insulating refractory thus obtained has the following composition by weight:

| | Percent |
|---|---|
| Neutral magnesium phosphate | 14.5 |
| Magnesia | 0.3 |
| Silica | 74.7 |
| Fibers | 10.5 |

It has the following properties:

| | |
|---|---|
| Density at 20° | gm./cc 0.56 |
| Density at 1000° | gm./cc 0.58 |
| Overall porosity | percent 77 |

Resistance to compression when cold:

| Percent: | Kg./cm.$^2$ |
|---|---|
| 5 | 2.7 |
| 15 | 6.0 |
| 30 | 14.0 |

Reheat—shrinkage:

| | Percent |
|---|---|
| 24 h. at 1200° | 1.3 |
| 24 h. at 1400° | 1.5 |

Melting point: 1680°

Heat conductivity in kcal./m./m.$^2$/° C./hr.:

| ° C. | |
|---|---|
| 200 | 0.110 |
| 400 | 0.124 |
| 600 | 0.162 |
| 800 | 0.178 |
| 1000 | 0.190 |

Having thus described the invention with the detail and particularity as required by the patent laws, what is desired protected by Letters Patent is set forth in the following claims.

We claim:

1. A process for fabricating a semirigid insulating refractory having a melting point of at least 1500° C. and a use-limit temperature of at least 1200° C. and having a density of less than 0.9 gm./cc. and having a resistance to crushing that increases with the ratio of crushing consisting essentially of by weight:

neutral magnesium phosphate—12 to 25%
alkaline-earth oxides in excess—0 to 5%
silica—50 to 80%
other acid oxides—0 to 20% and
mineral fibers—2 to 20% comprising the steps for:

(a) forming an aqueous mixture consisting essentially of silica, magnesia, mineral fibers and at least one compound selected from the group consisting of phosphoric anhydride, phosphoric acid and magnesium acid phosphate, the amount of water being 70 to 140% of the weight of the mineral batch materials;
(b) pouring the mixture into a mold to form a shape;
(c) perimtting the shape to gel and harden at ambient temperature by the formation of hydrated neutral phosphates; and
(d) oven drying the shape between 100 and 350° C. to remove at least 75% of the water.

2. A product made by the process of claim 1.

3. The product of claim 2 having a density between 0.4 and 0.6 gm./cc.

References Cited

UNITED STATES PATENTS

| 2,152,152 | 3/1939 | Prosen | 106—58 |
| 2,479,504 | 8/1949 | Moore et al. | 106—58 |
| 2,937,101 | 5/1960 | Nelson et al. | 106—58 |

JAMES E. POER, Primary Examiner

U.S. Cl. X.R.

106—58